(12) United States Patent
Deguchi et al.

(10) Patent No.: US 7,704,634 B2
(45) Date of Patent: Apr. 27, 2010

(54) METHOD FOR DESIGNING REDOX FLOW BATTERY SYSTEM

(75) Inventors: Hiroshige Deguchi, Osaka (JP); Toshio Shigematsu, Osaka (JP); Nobuyuki Tokuda, Osaka (JP)

(73) Assignees: Sumitomo Electric Industries, Ltd., Osaka (JP); The Kansai Electric Power Co., Inc., Osaka (JP)

( * ) Notice: Subject to any disclaimer, the term of this patent is extended or adjusted under 35 U.S.C. 154(b) by 1107 days.

(21) Appl. No.: 10/511,546

(22) PCT Filed: Apr. 21, 2003

(86) PCT No.: PCT/JP03/05059

§ 371 (c)(1),
(2), (4) Date: Oct. 18, 2004

(87) PCT Pub. No.: WO03/092110

PCT Pub. Date: Nov. 6, 2003

(65) Prior Publication Data

US 2005/0181273 A1    Aug. 18, 2005

(30) Foreign Application Priority Data

Apr. 23, 2002  (JP) ............................. 2002-120157

(51) Int. Cl.
*H01M 8/20* (2006.01)
(52) U.S. Cl. ...................................... 429/105; 429/101
(58) Field of Classification Search .................. 429/50, 429/101, 105
See application file for complete search history.

(56) References Cited

U.S. PATENT DOCUMENTS

| 4,786,567 A | 11/1988 | Skyllas-Kazacos et al. |
| 5,225,712 A * | 7/1993 | Erdman ....................... 290/44 |
| 6,111,767 A | 8/2000 | Handleman |

(Continued)

FOREIGN PATENT DOCUMENTS

JP    61-218070    9/1986

(Continued)

OTHER PUBLICATIONS

On-line translation of JP 2000-073932 A, Jul. 3, 2000.*

(Continued)

*Primary Examiner*—Dah-Wei D Yuan
*Assistant Examiner*—Katherine Turner
(74) *Attorney, Agent, or Firm*—McDermott Will & Emery LLP

(57) ABSTRACT

The present invention provides a method of designing a redox flow battery system that can prevent system efficiency loss caused by weak generation power or load power at the time of electric charge or discharge, without using any lead storage battery, and can also provide further improved system efficiency. In the present invention, generating equipment that varies irregularly in output of power generation is provided with the redox flow battery to smooth the output of power generation. An average value of output distribution of the battery with respect to the smoothed output of power generation and standard deviation are determined. Then, at least either of a specified output of the battery and a specified output of the converter for converting the battery output is determined based on the standard deviation.

4 Claims, 5 Drawing Sheets

U.S. PATENT DOCUMENTS

2001/0012211 A1* 8/2001 Hasegawa et al. ........... 363/131

FOREIGN PATENT DOCUMENTS

| JP | 4-12464 | 1/1992 |
| JP | 2000-73931 | 3/2000 |
| JP | 2000-73932 | 3/2000 |
| JP | 2000-78895 | 3/2000 |
| JP | 2001-339995 | 12/2001 |
| WO | WO 03/017407 * | 2/2003 |

OTHER PUBLICATIONS

Supplementary European Search Report issued in European Patent Application No. 03717669.0-2119/1536507 PCT/JP0305059, dated Jan. 7, 2010.

* cited by examiner

① $f(x) = 4.14 \times 10^{-4} \cdot x^2 + 2.33 \times 10^{-2} \cdot x + 14.0$
② $f(x) = 4.33 \times 10^{-4} \cdot x^2 + 2.28 \times 10^{-2} \cdot x + 11.6$
③ $f(x) = 4.72 \times 10^{-4} \cdot x^2 + 2.35 \times 10^{-2} \cdot x + 9.2$ $a = (-1.673) \cdot a' + 6.0418$
$b = (-0.073) \cdot b' + 2.3918$
$c = 1.3622 \cdot c' - 0.1795$

METHOD FOR DESIGNING REDOX FLOW BATTERY SYSTEM

TECHNICAL FIELD

The present invention relates to a method of designing a redox flow battery system including a redox flow battery to force electrolytic solution to be fed to and discharged from its cells. Particularly, the present invention relates to a method of designing a redox flow battery system that can reduce a battery system loss.

BACKGROUND ART

It is inherent in the electric power supply that power supply conforming to electricity consumption, what is called "simultaneous supply of equivalent electricity" is required. Meanwhile, developments of new energy resources, including power generation by wind and solar photovoltaic power generation, have been made increasingly in recent years. However, the power generation by wind, the solar photovoltaic power generation, and the like are all power sources which are irregular in output of power generation, due to which these power sources cannot serve as a satisfactory power supply source by themselves. Consideration is now being made on combination with some storage battery to stabilize the output of power generation. JP Laid-open (Unexamined) Patent Publication No. Sho 61-218070 describes the technique using a redox flow battery as the storage battery.

This publication describes that a lead storage battery, which does not need any moving parts, such as a pump and the like, is further annexed to the redox flow battery, in order to reduce a pump power loss and a loss caused by a shunt current, which contributes to reduction of combined efficiency of the redox flow battery, in response to input power.

In general, the redox flow battery is used for equalization of load or for countermeasure to voltage sag. FIG. 8 shows an explanatory view showing an operating principle of a general redox flow secondary battery. This battery has a cell 100 which is separated into a positive electrode cell 100A and a negative electrode cell 100B by a membrane 103 of an ion-exchange membrane. A positive electrode 104 and a negative electrode 105 are contained in the positive electrode cell 100A and the negative electrode cell 100B, respectively. A positive electrode tank 101 for feeding and discharging positive electrolytic solution to and from the positive electrode cell 100A is connected to the positive electrode cell 100A through conduit pipes 106, 107. Similarly, a negative electrode tank 102 for feeding and discharging negative electrolytic solution to and from the negative electrode cell 100B is connected to the negative electrode cell 100B through conduit pipes 109, 110. Aqueous solution containing ions that change in valence, such as vanadium ion, is used for the respective electrolytes and is circulated by using pumps 108, 111, to charge or discharge with an ionic valence change reaction at the positive and negative electrodes 104, 105. For example, when the electrolyte containing the vanadium ions is used, the following reactions occur in the cell during the charge or discharge of electricity:

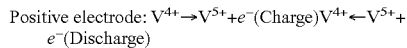
Positive electrode: $V^{4+} \rightarrow V^{5+} + e^-$ (Charge) $V^{4+} \leftarrow V^{5+} + e^-$ (Discharge)

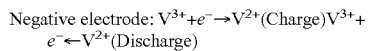
Negative electrode: $V^{3+} + e^- \rightarrow V^{2+}$ (Charge) $V^{3+} + e^- \leftarrow V^{2+}$ (Discharge)

However, the annex of the lead storage battery for the purpose of improving reduction of efficiency caused by weak power generation or load power at the time of electric charge or discharge or preventing increase of a system loss at the time of electric charge or discharge, as in the technique disclosed in the publication above, causes the problems of not only increase in production costs but also increase in scale of facilities.

Driving the pump for feeding and discharging the electrolyte to and from the cells is absolutely necessary for the redox flow battery. Due to this, the conventional employs the annex of the lead storage battery to the power source which is irregular in output of power generation, while suffering from the disadvantages of increase in production costs and others.

In general, a system loss means a total of a battery loss and a converter loss. The technique described in the publication cited above takes a pump power loss and a shunt current loss into consideration as factors of the battery loss, but takes no thought of an efficiency loss caused by a battery resistance (cell resistance). In view of this, the system that can provide further reduced loss is being desired.

Meanwhile, there are some conventional facilities in which only the redox flow battery is combined with the power source which is irregular in output of power generation, without the lead storage battery annexed thereto, taking no thought of the reduction of efficiency caused by weak generated power or load power at the time of electric charge or discharge. In these facilities, no study is made on how great magnitude the storage battery should be for combination with the magnitude (output of power generation, variation in output of power generation, etc.) of the power source which is irregular in output of power generation, such as power generation by wind and solar photovoltaic power generation, and no design guideline thereof is provided. In the circumstances above, the redox flow battery is practically operated, combining with the storage battery of a reasonable magnitude, or specifically, a magnitude of output about one half the total output of power generation, but this operation induces a great system loss, leading to deterioration of system efficiency.

Also, it is common that no study is made on how great the magnitude of the converter should be for combination with the magnitude (output of power generation, variation in output of power generation, etc.) of the power source which is irregular in output of power generation, such as power generation by wind and solar photovoltaic power generation, and no design guideline thereof is provided. For this, the redox flow battery combined with the power source irregular in output of power generation takes no thought of the converter loss.

Further, no study has been made on the design guideline that can provide further reduction of the system loss for the redox flow battery used for equalization of load power or countermeasure to irregular variation in power consumption, such as voltage sag, as well as for the redox flow battery used for stabilization of output of power source which is irregular in output of power generation.

Additionally, a method of designing an optimum redox flow battery considering not only the system loss but also reduction of production costs and scale of the facilities is being desired.

It is a primary object of the present invention to provide a method of designing a redox flow battery that can provide a more optimal operation for the redox flow battery which is irregularly operated for stabilization of an output of power generation of a power source which is unstable in generated power, as well as for control of supply and demand of electricity.

It is another object of the present invention to provide a method of designing a redox flow battery system that can reduce a system loss caused by weak generation power or load power at the time of electric charge or discharge, without using the lead storage battery.

DISCLOSURE OF THE INVENTION

The present invention is defined on the basis of the knowledge given below.

(1) Character to evaluate a system, such as a loss (loss characteristic), can be practically assumed as quadric functions.

(2) External parameter pertinent to the character, such as a battery output for a smoothened output of power generation, has a probability distribution.

(3) Expected value of the internal parameter pertinent to the character, such as a battery loss and a converter loss, is obtained from an average value of the internal parameter having the probability distribution, or standard deviation.

(4) Optimal value of the internal parameter to optimize the character can be determined from the forgoing. To be specific, for example a specified output of battery or a specified output of converter for providing further reduction of the system loss is determined. The internal parameter for optimizing the character is expressed as n times of the standard deviation of the probability distribution. To be specific, for example the specified output of battery or the specified output of converter for providing further reduction of the system loss can be expressed as n times of the standard deviation of the probability distribution.

The present invention is directed to a novel method of designing a redox flow battery system comprising a redox flow battery to force electrolytic solution to be fed to and discharged from its cells, comprising the steps of: first, determining an external parameter given by an operating condition of the redox flow battery a designer cannot choose voluntarily; then, determining an internal parameter given by a design condition of the redox flow battery the designer can design voluntarily; then, determining an average value of variables of the external parameter and standard deviation; and determining an optimum value of the internal parameter based on at least either of the resulting average value and the resulting standard deviation.

It has been thought to be impossible hitherto to take an improvement in increase of loss caused by weak generation power or load power at the time of electric charge or discharge, without using the lead storage battery annexed to a power source which is irregular in output of power generation. Also, there has been no knowledge of an optimum method for designing a redox flow battery which is irregularly operated not only for stabilization of output of that power source but also for control of supply and demand of electricity. After having studied the possibilities of improvement from various angles, the inventors have found that the characteristics of the battery system above (reduction in system loss) can be optimized by determining magnitudes (specified output, number of cells, etc.) of the redox flow battery, magnitudes (specified output, etc.) of the DC/AC converter, such as an inverter, and other operating conditions (flow rate of electrolyte for each cell, temperature of electrolyte, etc.) by the specified method mentioned above, leading to the accomplishment of the present invention. In the following, the present invention will be explained in further detail.

The external parameter is defined here as a parameter given by the operating condition of the redox flow battery the designer cannot choose voluntarily. The operating condition is properly varied depending on e.g. an atmosphere around the installation location of the redox flow battery, an intended application and purpose of the same battery, a user's demand, etc. To be more specific, for example, an outside air temperature at the installation location of the redox flow battery is an example of the parameter the designer cannot choose voluntarily. The others include the smoothing of an output of power generation of the generating equipment, such as power generation by wind and solar photovoltaic power generation, which varies irregularly in output of power generation, the equalization of load, and the countermeasure to voltage sag. These are the parameters which are determined depending on the user's demand for the intended applications and purposes, and the power generation and the power consumption in those applications and purposes can hardly be determined by the designer. Accordingly, related parameters to the parameters cited above, such as, for example, the battery output for smoothing the power generation of the generating equipment that varies irregularly in output of power generation, and the battery output for smoothing the power consumption of the load that varies irregularly in power consumption, are also the parameters the designer cannot determine voluntarily. Further, kW capacity and kWh of the redox flow battery are the parameters which are determined by the user's demand and cannot be determined by the designer voluntarily.

The external parameters that may be used include a parameter that takes a value that varies depending on a natural phenomenon, such as an outside air temperature at the installation location; a parameter that takes a value that depends on an irregular or stochastic phenomenon, such as, for example, a parameter that takes a value that varies temporarily, such as a battery output for smoothing irregular power generation or power consumption; and a parameter, such as kW capacity, that takes a fixed value. Thus, the external parameter may be only a parameter that takes a value that depends on a stochastic phenomenon, only a parameter that takes a fixed value, and, of course, a parameter that takes both of them, depending on the choice of the external parameter. Also, the external parameter may be used along or in combination of two or more.

The present invention defines, in particular, the external parameters including at least one of the parameters that take values that depend on the stochastic phenomenon as recited above. The external parameter may additionally include a parameter that takes a fixed value. It is assumed that the parameter that takes a value that depends on the stochastic phenomenon is given an average value and standard deviation (or variance). For example, when the battery output for smoothing the output of the power generation of the generating equipment that varies irregularly in output of power generation or the battery output for smoothing the power consumption of the load that varies irregularly in power consumption is chosen as the external parameter, the average value and the standard deviation can be determined from individual outputs that vary temporarily. The term of "individual outputs that vary temporarily" is intended to include, for example, a battery output (kW) at a point in time in a date, a sequent battery output (kW) at +one second after that, a further sequent battery output (kW) another +one second after, . . . . For example, when an outside air temperature at the installation location is chosen as the external parameter, the average and the standard deviation can be determined from individual ambient temperatures that vary temporarily. The term of "individual ambient temperatures that vary temporarily" is intended to include, for example, a temperature (K) at a point in time in a date, a sequent temperature (K) at +one second after that, a further sequent temperature (K) another +one second after, when examined at K (Kelvin) by the minute.

The external parameter having the average and the standard deviation as chosen for the application and purpose include, for example, those cited below. A battery output for smoothing the output of power generation of the generating equipment which varies irregularly in output of power generation can be cited as an external parameter for the application and purpose of smoothing the output of power generation of the generating equipment, such as power generation by wind and solar photovoltaic power generation, which varies irregularly in output of power generation. A battery output for smoothing the power consumption of the load that varies irregularly in power consumption can be cited as an external parameter for the application and purpose of equalizing the load power. An outside air temperature at the installation location can be cited as an external parameter for the application and purpose of countermeasure to voltage sag.

The phase of "smoothing the output of power generation" used herein is intended to mean that when an output of power generation exceeds a threshold as is preset for the output of power generation, the surplus output exceeding the threshold is charged in the battery, while on the other hand, when an output of power generation is less than the threshold, the output corresponding to the shortage is discharged from the battery. Also, the phase of "smoothing the power consumption" used herein is intended to mean that when power consumption exceeds a threshold as is also preset for the power consumption, the output corresponding to the shortage caused by the power consumption exceeding the threshold is discharged from the battery, while on the other hand, when power consumption is less than the threshold, the surplus output is charged in the battery. The same or different thresholds may be used for charging and discharging the battery. Also, the thresholds may be varied depending on the time required for the power generation and the output situation thereof.

The internal parameter is defined here as a parameter given by the design condition of the redox flow battery the designer can design voluntarily. To be more specific, the internal parameters that may be used include, for example, a specified output of the battery, the number of batteries, the number of cells, a fluid volume of an electrolytic solution reservoir tank, a flow rate of the electrolytic solution for each cell, a temperature of the electrolytic solution, a specified output of a DC/AC converter for converting the battery output, and the number of DC/AC converters for converting the battery output. Thus, the internal parameter is a parameter that takes a fixed value, differently from the external parameter. The internal parameter may be used alone or in combination of two or more.

Now, a method of calculating an optimum value of the internal parameter is explained concretely.

<1> The case where the external parameter is only a parameter that takes a fixed value:

Let the external parameter be represented as $x_1, x_2, \ldots x_1, x_2, \ldots$ are all taken as fixed values different from each other: for example, $x_1$: kW capacity, $x_2$: k Wh capacity, . . . .

Let the internal parameter be represented as $y_1, y_2, \ldots y_1, y_2,$ are taken as the parameters different from each other: for example, $y_1$: a specified output of battery, $y_2$: a specified output of a DC/AV converter, . . . .

Let the characteristic function to evaluate the system be represented as $f(x_1, x_2, \ldots, y_1, y_2, \ldots)$. f includes, for example, a system loss (efficiency), cost, and size. f includes at least one of these parameters.

Then, f is optimized when f takes a local extreme value, i.e., when $\partial f/\partial y_i = 0$ or when $y_i$ takes a maximum value or a minimum value in a variable range. In the latter case, a value at a boundary of the variable range can be cited as a possible maximum value or a possible minimum value.

Hence, when the external parameter is a parameter that takes a fixed value, the optimum value of f can be easily determined by partial differentiation as mentioned above.

<2> The case where the external parameter includes a parameter that takes a value that depends on an irregular or stochastic phenomenon:

Let the external parameter be represented as $x_1, x_2, \ldots x_i, \ldots$. It is assumed that $x_1, x_2, \ldots x_i, \ldots$ are parameters different from each other. Some of these parameters $x_i$ are the parameters that take values that depend on a stochastic phenomenon. For example, $x_{k1}(i=k1)$ is the battery output for smoothing output of power generation of the generating equipment that varies irregularly in output of power generation, and $x_{k2}(i=k2)$ is the outside air temperature at the installation location of the battery, etc. Also, $x_i$ is the parameter to which the average and the standard deviation are given. The average is represented as $x_{i\ ave}$, and the standard deviation is represented as $\sigma_{xi}$ (variance $\sigma_{xi}^2$). The other external parameters $x_1, x_2, \ldots$ are the parameters which take fixed values.

Let the internal parameter be represented as $y_1, y_2, \ldots$ in the same manner as in the above.

Then, if the characteristic function to evaluate the system $f(x_1, x_2, \ldots, y_1, y_2, \ldots)$ can be rewritten in the form of a new characteristic function $g(x_1, x_2, \ldots, x_{k1\ ave}, \sigma_{xk1}^2, x_{k2\ ave}, \sigma_{xh2}^2, \ldots, x_{i\ ave}, \sigma_{xi}^2, y_1, y_2, \ldots)$ considering the average $x_{i\ ave}$ and the variance $\sigma_{xi}^2$ of the external parameter $x_i$, then g can be optimized when g takes a local extreme value, when $\partial f/\partial y_i = 0$, or when $y_i$ takes a maximum value or a minimum value in a variable range.

Consequently, a possible condition for allowing $f(x_1, x_2, \ldots, y_1, y_2, \ldots)$ to be rewritten in the form $g(x_1, x_2, \ldots x_{k1\ ave}, \sigma_{xk1}^2, x_{k2\ ave}, \sigma_{xk2}^2, \ldots, x_{i\ ave}, \sigma_{xi}^2, y_1, y_2, \ldots)$ is set up, first.

Here, the parameter $x_i$ of the external parameters is assumed to have a value that depends on an irregular or stochastic phenomenon and also have an average value $x_{iave}$ and a variance $\sigma_{xi}^2$. Then, it is assumed that $x_i$ can obtain individual temporarily variable values $x_{i1}, x_{i2}, \ldots, x_{iN}$.

Then, it is assumed that the average $x_{i\ ave}$ can be given by Eq. 1.1 and the variance $\sigma_{xi}^2$ can be given by Eq. 1.2.

$$x_{i\ ave} = \frac{x_{i_1} + x_{i_2} + \ldots + x_{i_N}}{N} \quad \text{Eq. 1.1}$$

$$\sigma_{x_i}^2 = \frac{(x_{i\ ave} - x_{i_1})^2 + (x_{i\ ave} - x_{i_2})^2 + \ldots + (x_{i\ ave} - x_{i_N})^2}{N} \quad \text{Eq. 1.2}$$

When the individual temporarily variable values $x_{i1}, x_{i2}, \ldots, x_{iN}$ are rewritten in the form of $x_{i1} = x_{i\ ave} + \Delta_1, x_{i2} = x_{i\ ave} + \Delta_2, \ldots, x_{iN} = x_{i\ ave} + \Delta_N$ using an average $x_{i\ ave}$ and the difference $\Delta_j$ from the average $x_{i\ ave}$, they can be rewritten as the following Eq. 1.3 and Eq. 1.4.

$$\text{From Eq. 1.1,} \quad \Delta_1 + \Delta_2 + \ldots + \Delta_N = 0 \quad \text{Eq. 1.3}$$

$$\text{From Eq. 1.2,} \quad \frac{(\Delta_1)^2 + (\Delta_2)^2 + \ldots + (\Delta_N)^2}{N} = \sigma_{x_i}^2 \quad \text{Eq. 1.4}$$

Then, when the characteristic function $f(x_1, x_2, \ldots, y_1, y_2, \ldots)$ to evaluate the system is expanded around $x_{i\ ave}$, or with respect to $x_{i\ ave} + \Delta$, using Taylor expansion, Eq. 1.5 is given.

$$f(x_1, x_2, \ldots, x_{i\ ave} + \Delta, y_1, y_2, \ldots) = \quad \text{Eq. 1.5}$$
$$f(x_1, x_2, \ldots, x_{i\ ave}, y_1, y_2, \ldots) +$$
$$\frac{\partial f}{\partial x_i} \cdot \Delta + \frac{1}{2} \frac{\partial^2 f}{\partial x_i^2} \cdot \Delta^2 + \frac{1}{6} \frac{\partial^3 f}{\partial x_i^3} \cdot \Delta^3 + \ldots$$

When expected values $f_{ave}$ of the characteristic function $f$ with respect to the individual values $x_{i1}, x_{i2}, x_{iN}$ of the external parameter $x_i$ are determined by using Eq. 1.5 above, Eq. 1.6 is obtained.

$$f_{ave} = \frac{1}{N} \sum_{j=1}^{N} f(x_1, x_2, \ldots, x_{i_j}, y_1, y_2, \ldots) \quad \text{Eq. 1.6}$$
$$= f(x_1, x_2, \ldots, x_{i\ ave}, y_1, y_2, \ldots) +$$
$$\frac{\partial f}{\partial x_i} \cdot \left( \frac{\Delta_1 + \Delta_2 + \ldots + \Delta_N}{N} \right) +$$
$$\frac{1}{2} \frac{\partial^2 f}{\partial x_i^2} \cdot \left( \frac{(\Delta_1)^2 + (\Delta_2)^2 + \ldots + (\Delta_N)^2}{N} \right) +$$
$$\frac{1}{6} \frac{\partial^3 f}{\partial x_i^3} \cdot \left( \frac{(\Delta_1)^3 + (\Delta_2)^3 + \ldots + (\Delta_N)^3}{N} \right) + \ldots$$

When Eq. 1.3 and Eq. 1.4 are substituted for Eq. 1.6 above, Eq. 1.7 is obtained.

$$f_{ave} = f(x_1, x_2, \ldots, x_{i\ ave}, y_1, y_2, \ldots) + \frac{1}{2} \frac{\partial^2 f}{\partial x_i^2} \cdot \sigma_{x_i}^2 + \quad \text{Eq. 1.7}$$
$$\frac{1}{6} \frac{\partial^3 f}{\partial x_i^3} \cdot \left( \frac{(\Delta_1)^3 + (\Delta_2)^3 + \ldots + (\Delta_N)^3}{N} \right) + \ldots .$$

Hence, it is derived from Eq. 1.7 that when third or more order derivatives of $f(x_1, x_2, \ldots x_i, y_1, y_2, \ldots)$ at $x_i$ becomes zero, i.e., when the following Eq. 1.8 is satisfied, it is made possible to rewrite $f(x_1, x_2, \ldots, x_i, Y_1, y_2, \ldots)$ in the form of $g(x_1, x_2, \ldots, x_{i\ ave}, \sigma_{xi}^2, y_1, y_2, \ldots)$.

$$\frac{\partial^3 f}{\partial x_i^3} = \frac{\partial^4 f}{\partial x_i^4} = \ldots = 0 \quad \text{Eq. 1.8}$$

This is the case where $f(x_1, x_2, \ldots, x_i, y_1, y_2, \ldots)$ is in the form of a quadratic equation with respect to $x_i$. Specifically, when $$f(x_1, x_2, \ldots, x_i, y_1, y_2, \ldots) = \quad \text{(Eq. 1.9)}$$
$$a(x_1, x_2, \ldots, y_1, y_2, \ldots) \cdot x_i^2 +$$
$$b(x_1, x_2, \ldots, y_1, y_2, \ldots) \cdot x_i + c(x_1, x_2, \ldots, y_1, y_2, \ldots),$$
$$g(x_1, x_2, \ldots, x_{i\ ave}, \sigma_{xi}^2, \ldots, y_1, y_2, \ldots) = \quad \text{(Eq. 1.10)}$$
$$a \cdot x_i^2 + b \cdot x_i + c + a \cdot \sigma_{xi}^2.$$

This indicates that the condition for allowing $f(x_1, x_2, \ldots, y_1, y_2, \ldots)$ to be rewritten in the form of $g(x_1, x_2, \ldots, x_{k1\ ave}, \sigma_{xk1}^2, x_{k2\ ave}, \sigma_{xk2}^2, \ldots, x_{i\ ave}, \sigma_{xi}^2, y_1, y_2, \ldots)$ is obtained when $f(x_1, x_2, \ldots, x_i, y_1, y_2, \ldots)$ comes to be in the form of quadratic equation with the external parameter $x_i$ having the average and the variance.

It should be noted that if $f(x_1, x_2, \ldots, x_i, y_1, y_2, \ldots)$ does not exactly comes to be in the form of quadratic equation with respect to $x_i$ but comes near the quadratic equation, then second order derivatives will also be taken into consideration. Practically, there seems to be many cases where the quadratic equation is sufficient to approximate the actual properties. But, it is derived from Eq. 1.7 that a cubic or more equation can also be used to approximate the actual properties, considering the effect of terms higher than a quadratic term, specifically:

$$\frac{(\Delta_1)^3 + (\Delta_2)^3 + \ldots + (\Delta_N)^3}{N}, \frac{(\Delta_1)^4 + (\Delta_2)^4 + \ldots + (\Delta_N)^4}{N} \ldots$$

To give actual examples in the following:

(1) The case where $f$ comes to be in the form of linear expression with respect to $x_i$:

$$f = a \cdot x_i + b \to g = a \cdot x_{i\ ave} + b$$

Hence, $g$ has an optimum value obtained by the average $x_{i\ ave}$.

(2) The case where $f$ comes to be in the form of quadratic expression with respect to $x_i$:

$$f = a \cdot x_i^2 + b \cdot x_i + c \to g = a \cdot x_{i\ ave}^2 + b \cdot x_{i\ ave} + c + a \cdot \sigma_{xi}^2$$

Hence, $g$ has an optimum value obtained by the average $x_{i\ ave}$ and the variance $\sigma_{xi}^2$.

(3) The case where $f$ comes to be in the form of cubic expression with respect to $x_i$:

$$f = a \cdot x_i^3 + b \cdot x_i^2 + c \cdot x_i + d \to$$
$$f = a \cdot x_{i\ ave}^3 + 3a \cdot x_{i\ ave} \cdot \sigma_{xi}^2 + a \cdot \frac{(\Delta_{i_1})^3 + (\Delta_{i_2})^3 + \ldots + (\Delta_{i_N})^3}{N} +$$
$$b \cdot x_{i\ ave}^2 + b \cdot \sigma_{xi}^2 + c \cdot x_{i\ ave} + d$$

Hence, $g$ has an optimum value obtained by the average $x_{i\ ave}$, the variance $\sigma_{xi}^2$, and $$\frac{(\Delta_{i_1})^3 + (\Delta_{i_2})^3 + \ldots + (\Delta_{i_N})^3}{N}.$$

Although the case where a single external parameter having a value that depends on an irregular or stochastic phenomenon or a single parameter to which average and standard deviation are given is chosen among the external parameters has been described above, there may be the case where two or more external parameters are chosen among the external parameters. In this case, f can be rewritten in the form of quadratic expression concerning those parameters. Take the case where two external parameters to which average and standard deviation are given are chosen, for instance.

Let the external parameters to which average and standard deviation are given be represented as x, y. Also, let their averages and variants be represented as $x_{ave}$, $y_{ave}$, $\sigma_x^2$, $\sigma_y^2$, respectively. It is assumed that these parameters x, y are not correlated with each other.

Then, assuming that the characteristic function f(x, y) can be arranged in the form of quadratic function with two unknowns with respect to x and y, and letting a coefficient be represented as $a_{ij}$, it can be rewritten as follows.

$$f = a_{22} \cdot x^2 \cdot y^2 + a_{21} \cdot x^2 \cdot y^1 + a_{20} \cdot x^2 \cdot y^0 + a_{12} \cdot x^1 \cdot y^2 +$$
$$a_{11} \cdot x^1 \cdot y^1 + a_{10} \cdot x^1 \cdot y^0 + a_{02} \cdot x^0 \cdot y^2 + a_{01} \cdot x^0 \cdot y^1 + a_{00} \cdot x^0 \cdot y^0$$

When rearranging this in the form of $x=x_{ave}+\Delta_x$, $y=y_{ave}+\Delta_y$ by using difference $\Delta$ between the individual temporarily variable values and the average and then substituting them for the function f, $$f = a_{22} \cdot (x_{ave} + \Delta_x)^2 \cdot (y_{ave} + \Delta_y)^2 +$$
$$a_{21} \cdot (x_{ave} + \Delta_x)^2 \cdot (y_{ave} + \Delta_y) + a_{20} \cdot (x_{ave} + \Delta_x)^2 +$$
$$a_{12} \cdot (x_{ave} + \Delta_x) \cdot (y_{ave} + \Delta_y)^2 + a_{11} \cdot (x_{ave} + \Delta_x) \cdot (y_{ave} + \Delta_y) +$$
$$a_{10} \cdot (x_{ave} + \Delta_x) + a_{02} \cdot (y_{ave} + \Delta_y)^2 + a_{01} \cdot (y_{ave} + \Delta_y) + a_{00}$$

When the terms of the function f above are expanded by using Taylor expansion, consideration of the effects of the averages and variants of the external parameters must be given to the expanded terms including $\Delta_x$, $\Delta_y$, $\Delta_x^2$, $\Delta_y^2$, $\Delta_x\Delta_y$, $\Delta_x\Delta_y^2$, $\Delta_x^2\Delta_y$, $\Delta_x^2\Delta_y^2$ as the coefficients.

The following change of variables is given to the respective expanded terms of the function f.

$$\Delta_x \to 0 \;\; \Delta_y \to 0 \;\; \Delta_x^2 \to \sigma_x^2 \;\; \Delta_y^2 \to \sigma_y^2 \;\; \Delta_x\Delta_y \to 0 \quad \text{①}$$

$$\Delta_x\Delta_y^2 \to 0 \;\; \Delta_x^2\Delta_y \to 0 \;\; \Delta_x^2\Delta_y^2 \to \sigma_x^2\sigma_y^2 \quad \text{②}$$

In the change of variables ①, $\Delta_x \to 0$, $\Delta_y \to 0$, $\Delta_x^2 \to \sigma_x^2$, $\Delta_y^2 \to \sigma_y^2$ are determined from the definitions of the averages and the variances. $\Delta_x\Delta_y \to 0$ is determined from the definition of "non-correlated". As to the change of variables ②, it is assumed that the same change as above is given.

f(x, y) may be rewritten in the form of $g(x_{ave}, y_{ave}, \sigma_x^2, \sigma_y^2)$ by using the change of variables of ① and ② above.

Following the sequences above, the calculation is made for optimization of the system. Particularly, when at least one of a specified output of battery, number of batteries, a specified output of DC/AC converter for converting the battery output, and number of DC/AC converters for converting the battery output is obtained from the battery output of the redox flow battery for smoothing output of power generation of generating equipment which varies irregularly in output of power generation, the following procedures may be taken. First, standard deviation of output distribution of the redox flow battery used for smoothing output of power generation of the generating equipment which varies irregularly in output of power generation is determined. Then, based on the resulting standard deviation, the at least one of the specified output of battery, the number of batteries, the specified output of DC/AC converter, and the number of DC/AC converters is determined.

It is preferable that the specified output of the DC/AC converter is in the range of not less than 1 time to not more than 4 times, or preferably in the range of not less than 1 time to not more than 2.5 times, of the standard deviation of the output distribution of the battery with respect to the smoothed output of power generation. Also, it is preferable that the specified output of the battery is in the range of not less than 0.7 time to not more than 2 times, or preferably in the range of not less than 0.9 time to not more than 1.5 times, of the standard deviation above. When the specified output of the converter or that of the redox flow battery satisfies the value specified above, the system loss can be reduced further, leading to further improvement in system efficiency. The specified output of the battery can be changed by changing area or dimension of the electrode, changing the number of cells arranged in series/parallel, and so on. The specified output of the converter can be changed by changing capacity of a semiconductor device used in the converter, changing the number of devices arranged in series/parallel, and so on.

BEST MODE FOR CARRYING OUT THE INVENTION

Figure 1:
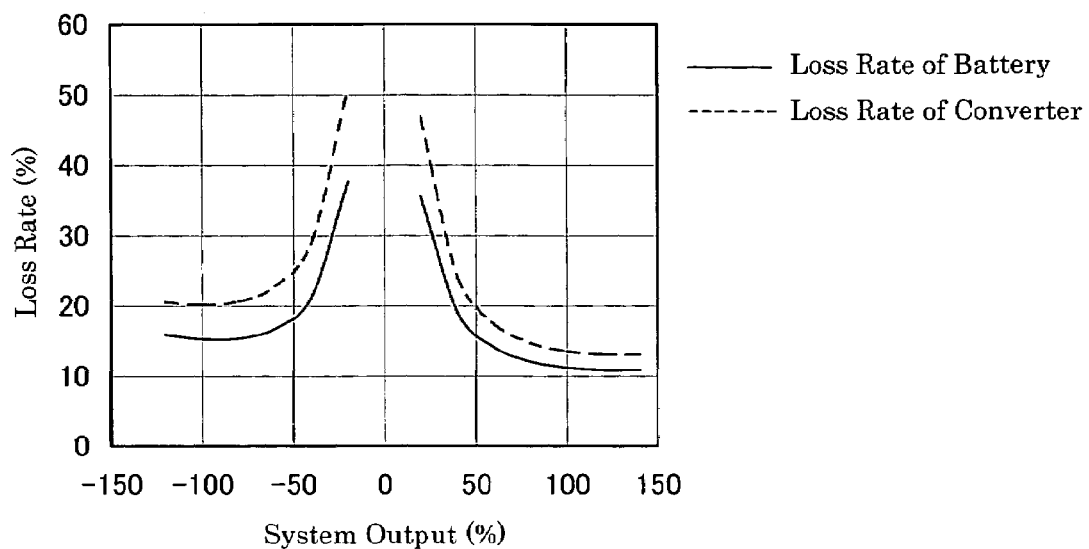
FIG. 1 is a graph showing a relation between a loss characteristic of a redox flow battery and a loss rate of the same.

In the following, an embodiment of the present invention is described.

(Outline of a Calculation Method of an Optimum Value of Internal Parameter)

(1) Choose $x_1$, $x_2$ as external parameter. Choose $y_1$, $y_2$ as internal parameter.

It is assumed that the external parameter $x_1$ depends on an irregular or stochastic phenomenon and an average value $x_{1ave}$ and a variance $\sigma_{x1}^2$ are given. It is also assumed that the external parameter $x_2$ is given a fixed value.

(2) A characteristic function to evaluate the system $f(x_1, x_2, y_1, y_2)$ is determined and f is arranged in the form of quadratic equation with respect to $x_1$.

$$f = a(x_2, y_1, y_2)x_1^2 + b(x_2, y_1, y_2)x_1 + c(x_2, y_1, y_2)$$

(3) A new characteristic function g considering an average value $x_{1ave}$ and a variance $\sigma_{x1}^2$ of the external parameter $x_1$ is given as follows.

$$g = a(x_2, y_1, y_2)x_{1ave}^2 + b(x_2, y_1, y_2)x_{1ave} + c(x_2, y_1, y_2) + a(x_2, y_1, y_2)\sigma_{x1}^2$$

(4) $y_i$ when the new characteristic function g takes an extreme value, i.e., $y_i$ when $\partial f/\partial y_i = 0$, or a maximum value or a minimum value in a variable range of $y_i$ is a candidate for optimizing g. Then, $y_i$ to optimize g is an optimum value of the internal parameter.

In the following, the external parameter, the internal parameter, and the characteristic function f are respectively explained concretely. In the example, reference is made to a calculation method of an optimum value of the internal parameter that can optimize the system efficiency for the purpose of smoothing of an output of power generation of the generating equipment, such as the power generation by wind and the solar photovoltaic power generation, which varies irregularly in output of power generation.

(The Case Where an Output of Battery is Constant to a Smoothed Output of Electricity)

An output of battery (hereinafter it is referred to as battery output) for the smoothed output of power generation is chosen as the external parameter. Here, the battery output is considered to be constant. Also, a specified output of the redox flow battery, a specified output of the converter, a flow rate of electrolyte, and a temperature of the electrolyte are taken as the internal parameter.

With the system efficiency at the time of electric charge or discharge defined by ① battery output/(battery output+loss) and ② (battery output−loss)/battery output, and a loss rate defined by ③ loss/battery output, the condition for maximizing the system efficiency or the condition for minimizing the loss rate is determined with respect to each definition. In any case, the system efficiency and the loss rate are partial-differentiated with respect to the battery output and the internal parameter to determine the condition for maximizing the system efficiency or the condition for minimizing the loss rate ① is described below, first.

Let the battery output be represented as x, the internal parameter as y, the loss as f(x, y), and the system efficiency at the time of electricity charge or discharge as $\eta=x/(x+f)$. When the system efficiency is maximized, the efficiency takes a local extreme value. Hence, the condition for maximizing the system efficiency is $\partial \eta/\partial x=0$, $\partial \eta/\partial y=0$, or leads to the following equations 2.1 and 2.2:

$$\frac{\partial \eta}{\partial x} = \frac{1 \cdot (x+f) - x \cdot \left(1 + \frac{\partial f}{\partial x}\right)}{(x+f)^2} = 0 \qquad \text{Eq. 2.1}$$

$$\frac{\partial \eta}{\partial y} = \frac{0 \cdot (x+f) - x \cdot \left(0 + \frac{\partial f}{\partial y}\right)}{(x+f)^2} = 0 \qquad \text{Eq. 2.2}$$

It follows from the denominator $(x+f)^2>0$ in Eq. 2.1 and Eq. 2.2 that the numerator=0. Hence, with respect to ①, the condition for maximizing the system efficiency is given when satisfying the following equations 2.3 and 2.4.

$$\frac{f}{x} - \frac{\partial f}{\partial x} = 0 \qquad \text{Eq. 2.3}$$

$$\frac{\partial f}{\partial y} = 0 \qquad \text{Eq. 2.4}$$

The same calculation was made to determine the conditions with respect to ② and ③. It was found therefrom that the conditions derived from the fact that when the system efficiency is maximized, the efficiency takes a local extreme value, or when the loss rate is minimized, the loss rate takes a local extreme value are both the same as the condition above. To be specific, those conditions also satisfied Eq. 2.3 and Eq. 2.4. This means that even when the definitions of the system efficiency are different and the figures themselves of the efficiency are different, or even when considering from the viewpoint of the loss rate, the system efficiency is maximized (the loss rate is minimized) with the same battery output and internal parameter. Hence, the loss rate can be determined by doing a mathematical simulation of the relation between the loss and the output and internal parameter of the redox flow battery and then dividing the resulting loss by the output of the AC end-cell battery. Shown in FIG. 1 is an example of a graph showing a relation between a loss characteristic of the redox flow battery and a loss rate of the same.

As shown in FIG. 1, when electricity is charged (when output of the system is positive), the loss rate of the battery and that of the converter are minimized when the output of the system is little under 150%, from which it can be seen that the battery loss and the converter loss can be minimized at that time. When electricity is discharged, the loss rate of the battery and that of the converter are minimized when the output of the system is about −100%, from which it can be seen that the battery loss and the converter loss can be minimized at that time.

From the foregoing, it can be seen that in the case where the battery output is constant, the battery output and the internal parameter that can allow maximization of the system efficiency (minimization of the loss rate) or can allow minimization of the system loss can be determined.

(The Case Where the Battery Output Depends on a Stochastic Phenomenon)

Next, consideration will be given to the case where the output of power generation varies irregularly, or specifically, the case where the battery output has a probability distribution. Let the battery output at a regular time interval ($\Delta t$) be represented as $x_1, x_2, \ldots, x_n$, the internal parameter as y, the loss as $f(x_1,y), f(x_2,y), \ldots, f(x_n,y)$, and the system efficiency at the time of charge or discharge of electricity as $\eta$. The battery output $x_1, x_2, \ldots, x_n$ has a probability distribution, so the average $x_{ave}$ gives Eq. 3.1 and the variance $\sigma^2$ gives Eq. 3.2. Then, when $f(x_i,y)$ is expanded around $x_{ave}$, using Taylor expansion, Eq. 3.3 is given.

$$x_{ave} = \frac{\Sigma x_i}{n} \qquad \text{Eq. 3.1}$$

$$\sigma^2 = \frac{\Sigma(x_i - x_{ave})^2}{n} \qquad \text{Eq. 3.2}$$

$$f(x_i, y) = f(x_{ave}, y) + \frac{\partial f}{\partial x}(x_i - x_{abc}) + \frac{\partial^2 f}{2\partial x^2}(x_i - x_{ave})^2 + \ldots \qquad \text{Eq. 3.3}$$

It follows from Eq. 3.1 that $\Sigma x_i = n \cdot x_{ave}$ (Eq. 3.4) and from Eq. 3.3 that $\Sigma f(x_i,y)$ leads to Eq. 3.5.

$$\Sigma f(x_i, y) = n \cdot \left(f(x_{ave}, y) + \frac{\partial^2 f}{2\partial x^2}\sigma^2 + \ldots\right) \qquad \text{Eq. 3.5}$$

Here, if $n \cdot x_{ave}$ of Eq. 3.4 is taken as x in the case where the battery output is constant and the corresponding part of Eq. 3.5 to Eq. 3.6 given below is taken as f(x,y), then the case where the battery output has a probability distribution can also be dealt with in the same manner as in the case where the battery output is constant.

$$n \cdot \left(f(x_{ave}, y) + \frac{\partial^2 f}{2\partial x^2}\sigma^2 + \ldots\right) \qquad \text{Eq. 3.6}$$

Then, if f(x,y) is taken as a function with x, and the loss characteristic of the battery and that of the converter are practically taken as quadratic functions, then third or more order derivatives can be taken as substantially zero. To be specific, in the case where the probability distribution is considered, the loss characteristic which is to be dealt with by $f(x)=a \cdot x^2+b \cdot x+c$ (Eq. 3.7) with respect to a constant battery output x can be dealt with by $g(x_{ave}, \sigma^2)=a \cdot x_{ave}^2+b \cdot x_{ave}+c+a \cdot \sigma^2$ (Eq. 3.8) with respect to the battery output's average $x_{ave}$ and variance $\sigma^2$,

EXAMPLE

A redox flow battery system including generating equipment that varies irregularly in output of power generation, a redox flow battery for smoothing the irregular output of power generation, and a DC/AC converter for converting the battery output was produced, and the loss characteristic of the battery and that of the converter were examined.

Figure 2:
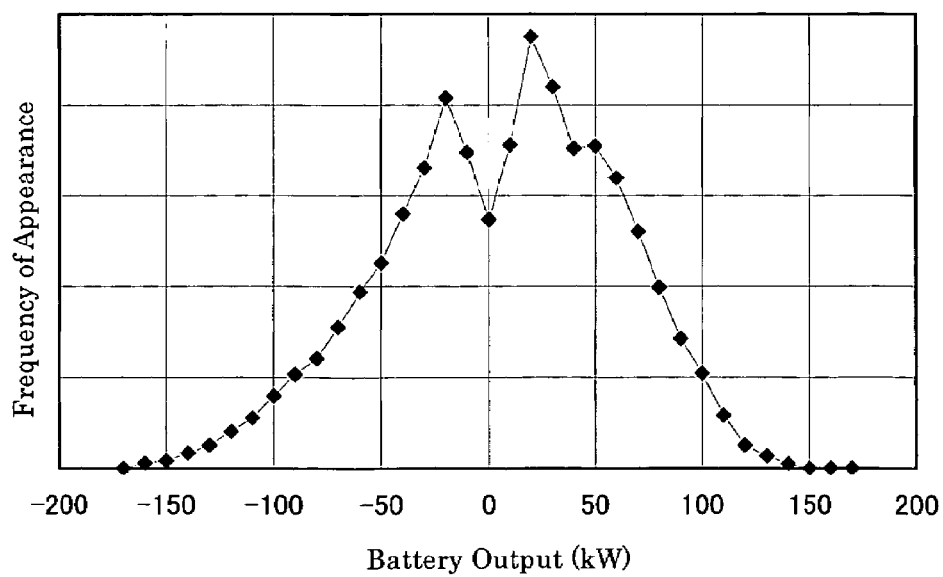
FIG. 2 is a histogram of an output of a battery of a battery system.
Figure 8:
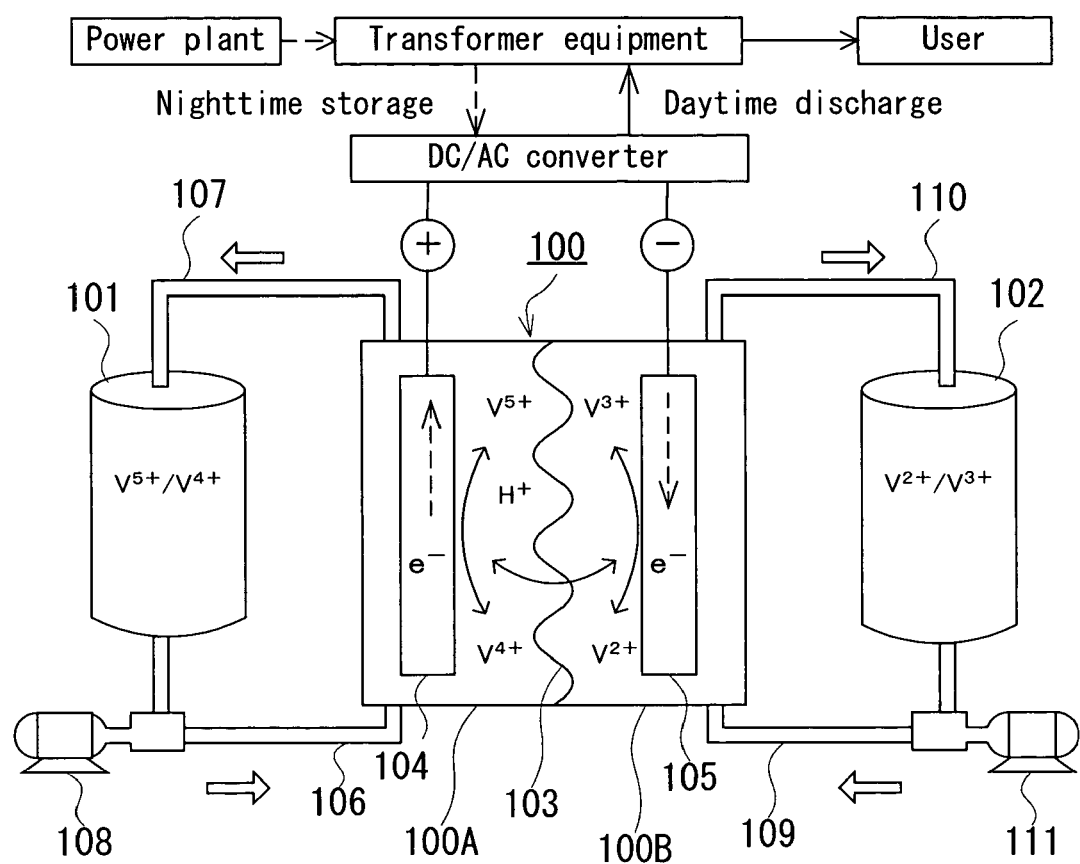
FIG. 8 is a schematic view showing an operating principle of the redox flow battery.

A power generation by wind having a maximum output of power generation of 400 kW (specified output of power generation: 275 kW) was used as the generating equipment. A redox flow battery having the construction shown in FIG. 8 was produced as the redox flow battery and set at a specified battery output of 170 kW (about 60% of the specified output of power generation). A DC/AC converter having a specified converter output of 275 kW was used. A histogram of 8-hour battery output for the battery system comprising the generating equipment, the redox flow battery and the converter is shown in FIG. 2. The distribution characteristic is shown below. The standard deviation was determined by smoothing the output of power generation of the generating equipment by using the battery, followed by the output distribution of the battery with respect to the resulting smoothed output of power generation. The term of "specified output of battery" means an output at which the system efficiency is maximized during the load smoothing operation of the battery. Also, the term of "specified output of converter" means an output at which the conversion efficiency of DC→AC or AC→DC is maximized.

Distribution characteristic of charged/discharged power at the time of smoothing of output of power generation:

| | |
|---|---|
| Smoothed output of power generation by wind: | 200 kW |
| Average value of battery output: | 0.9 kW |
| Standard derivation of battery output: | 54.1 kW |
| Average of absolute value of battery output: (Determination of number of converters) | 44.4 kW |

Figure 3:
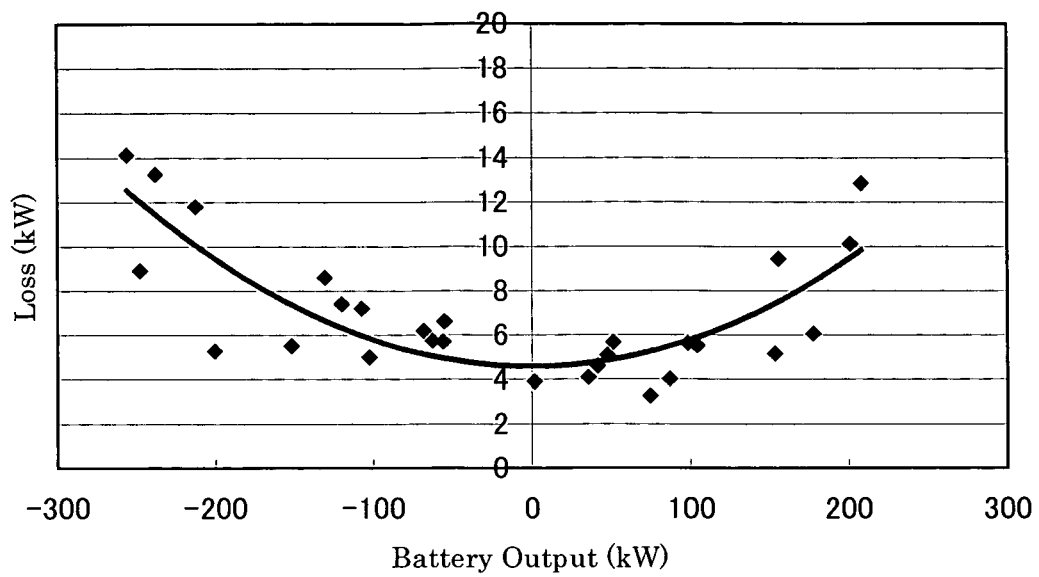
FIG. 3 is a graph showing a loss characteristic of a converter with respect to an output of an AC end-cell battery.

Then, the loss characteristic of the DC/AC converter was determined (by factory test). The results are shown in FIG. 3. It is found from an approximated curve shown in FIG. 3 that it follows from Eq. 3.7 that the converter loss $f(x)=1.22 \times 10^{-4} \cdot x^2-1.74 \times 10^{-6} \cdot x+4.58$ with respect to the constant battery output x. Hence, it follows from Eq. 3.8 that an expected value of the loss characteristic with respect to the battery output at the time of the smoothing operation of the power generation by wind having the probability distribution $g(x_{ave}, \sigma^2)=1.22 \times 10^{-4} \cdot (0.9^2+54.1^2)-1.74 \times 10^{-6} \cdot 0.9+4.58=4.94$ kW ($x_{ave}=0.9$, $\sigma^2=54.1^2$). It is to be noted that in $g(x_{ave}, \sigma^2)$ of the equation above, the average value $x_{ave}$ has negligible effects on the loss.

The internal parameter that can keep the loss characteristic of the converter of the specified output of 275 kW is discussed further concretely. For example, the case where n converters of the specified output of 275 kW are arranged in parallel is considered as the internal parameter. Then, the output for each converter is 1/n. Then, the expected value of the loss characteristic for each converter is $f(x)=1.22 \times 10^{-4} \cdot (x/n)^2-1.74 \times 10^{-6} \cdot (x/n)+4.58$. Then, the expected value of the total loss characteristics in the case where n converters of the specified output of 275 kW are arranged in parallel is $f(x,n)=1.22 \times 10^{-4}/n \cdot x^2-1.74 \times 10^{-6} \cdot x+4.58 \cdot n$. Hence, $g(x_{ave}, \sigma^2, n)=1.22 \times 10^{-4}/n \cdot (x_{ave}^2+\sigma^2)-1.74 \times 10^{-6} \cdot x_{ave}+4.58 \cdot n$. It follows from average: $x_{ave}=0.9$, variance $\sigma^2=54.1^2$ that $g(n)=1.22 \times 10^{-4}/n \cdot (0.9^2+54.1^2)-1.74 \times 10^{-6} \cdot 0.9+4.58 \cdot n \approx 0.3572/n-1.57 \times 10^{-6}+4.58 \cdot n$. Then, when finding n such that $\partial g/\partial n=0$, $-0.3572/n^2+4.58=0$, so $n \approx 0.28$.

A variable range of n is $0 \leq n \leq \infty$. Then, 0 can be cited as a possible minimum value n, and infinity can be cited as a possible maximum value, but when $n \to 0$, $g \to \infty$, and when $n \to \infty$, $g \to \infty$, so $n \approx 0.28$ cited above is an optimum value.

Figure 4:
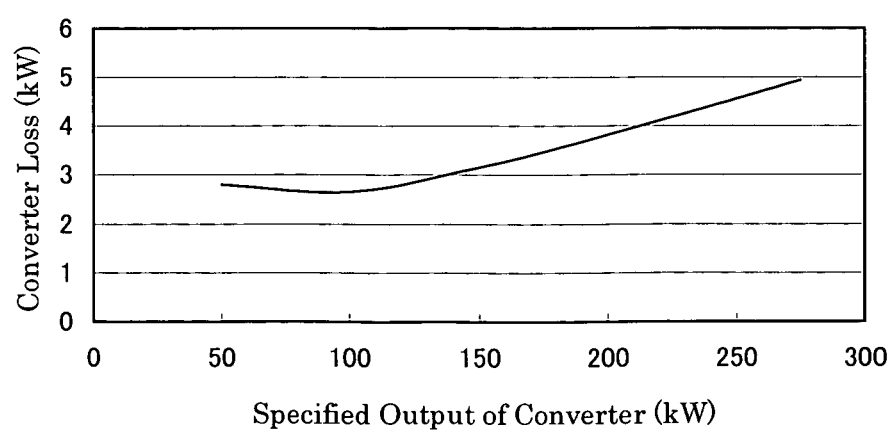
FIG. 4 is a graph showing a relation between a specified output of the converter and a loss characteristic of the same.

This means that when 0.28 converter of the specified output of 275 kW is used, the loss can be minimized. In other words, when a converter of a specified output of $275 \times 0.28 \approx 77$ kW is used, the loss can be minimized. FIG. 4 shows the expected value of the loss characteristic of the converter (converter loss).

It can be seen from FIG. 4 that in this example, when the specified output of the DC/AC converter is in the range of about 50 kW to about 200 kW (about 1 to about 4 times of the standard deviation of 54.1 kW), or particularly in the range of about 50 kW to about 120 kW (about 1 to about 2.2 times of the same), the converter loss is reduced and thus the system loss can be reduced. From the foregoing, it can be seen that when the specified output is set at 77 kW, the system loss can be minimized.

(Determination of Number of Batteries and Flow Rate Per Unit Time)

Figure 5:
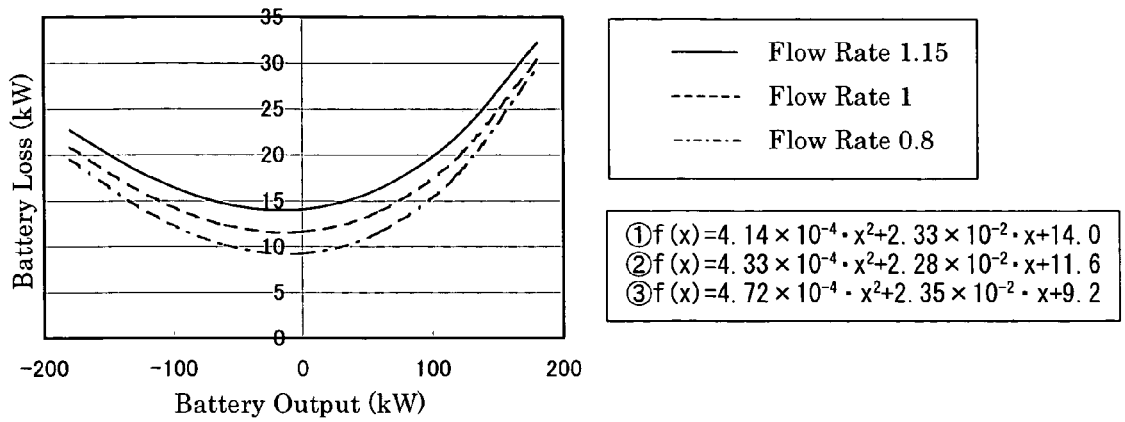
FIG. 5 is a graph showing the loss characteristic of the redox flow battery with respect to the output of the AC end-cell battery.

Then, the loss characteristic of the redox flow battery was determined. The results are shown in FIG. 5. Since the loss characteristic of the battery varies depending on a flow rate of electrolyte per unit time for each cell, the loss characteristic of the battery (battery loss) is determined, varying the flow rate as follows.

① 0.80 liter/min.·cell
② 1.00 liter/min.·cell
③ 1.15 liter/min.·cell

The loss characteristic of the battery can be determined from an approximated curve shown in FIG. 5 in the same manner as in that of the converter mentioned above. Take ② the flow rate of 1.00 liter/min.·cell for instance, it follows from Eq. 3.8 that $g(x_{ave}, \sigma^2)=4.33 \times 10^{-4} \cdot (x_{ave}^2+\sigma^2)-2.28 \times 10^{-2} \cdot x_{ave}+11.6$ with respect to the battery output at the time of smoothing operation of the power generation by wind having the probability distribution. Hence, it follows from $x_{ave}=0.9$, $\sigma^2=54.1^2$ that the expected value of the loss characteristic $g(x_{ave}, \sigma^2)=4.33 \times 10^{-4} \cdot (0.9^2+54.1^2)-2.28 \times 10^{-2} \cdot 0.9+11.6=12.8$ kW. Similarly, in the case of ③ 0.80 liter/min.·cell, it follows from Eq. 3.8 that $g(x_{ave}, \sigma^2)=4.72 \times 10^{-4} \cdot (x_{ave}^2+\sigma^2)-2.35 \times 10^{-2} \cdot x_{ave}+9.2$, so the expected value of the loss characteristic $g(x_{ave}, \sigma^2)=10.6$ kW.

The internal parameter that can keep the loss characteristic of the battery of the specified output of 170 kW is discussed further concretely. For example, the case where n batteries of the specified output of 170 kW are arranged in parallel is considered as the internal parameter. Also, the flow rate of electrolyte per unit time for each cell is also determined for the operating condition. Then, the output for each battery is 1/n. Then, the loss characteristic for each battery is $f(x)=a(x/n)^2+b(x/n)+c$. Then, the expected value of the total loss characteristics in the case where n batteries are arranged in parallel is $f(x,n)=ax^2/n+bx+cn$. Coefficients a, b, c of $f(x,n)$ are derived from an approximate expression shown in FIG. 5. Also, the relation between the coefficients a, b, c and the flow rate of electrolyte per unit time for each cell is shown in FIG. 6.

Figure 6:
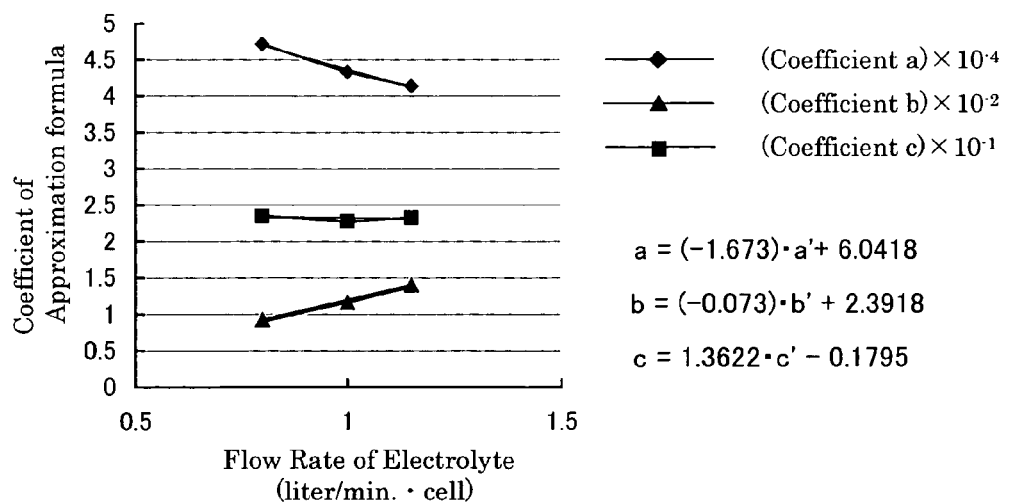
FIG. 6 is a graph showing a relation between a coefficient of an approximation formula and a flow rate of electrolyte per unit time for each cell.

The graph of FIG. 6 showing the coefficients is plotted, using the coefficients of their respective quadratic functions shown in FIG. 5. Take the coefficient a, for example: when the approximation formula is determined from the quadratic coefficients of 4.14, 4.33, and 4.72 of their respective quadratic functions ①, ② and ③ shown in FIG. 5, it can be determined to be $a(\times 10^{-4})=(-1.673)\cdot a'+6.0418$, using the variance a'. The same applies to the coefficients b and c.

Then, it follows from FIGS. 5 and 6 that $f(x,n,L)=\{(-1.673 L+6.0418)\times 10^{-4}\}/n\cdot x^2+\{(-0.073 L+2.3918)\times 10^{-2}\}\cdot x+\{(1.3622 L-0.1795)\times 10^1\}\cdot n$, where L(liter/min.) is a flow rate of the electrolyte for each cell.

Hence, $g(x_{ave}, \sigma^2, n,L)=\{(-1.672 L+6.0418)\times 10^{-4}\}/n\cdot (x_{ave}^2+\sigma^2)+\{(-0.073 L+2.3918)\times 10^{-2}\}\cdot x_{ave}+\{(1.3622 L-0.1795)\times 10^1\}\cdot n$. It follows from average $x_{ave}=0.9$, variance $\sigma^2=54.1^2$ that $g(n,L)=(-0.490 L+1.769)/n+(-0.0657 L+2.153)\times 10^{-2}+\{(1.3622 L-0.1795)\times 101\}\cdot n$. Then, when finding n such that $\partial g/\partial n=0$, $\partial g/\partial n=-(-0.490 L+1.769)/n^2+(13.622 L-1.795)=0$, so, $n=\sqrt{\{(-0.490 L+1.769)/(13.622 L-1.795)\}}$.

Also, when finding n such that $\partial g/\partial L=0$, $\partial g/\partial L=-0.490/n-0.000657+13.622\cdot n=0$. Then, it follows from n>0 that n≈0.19. Then, it follows from $0.19=\sqrt{\{(-0.490 L+1.769)/(13.622 L-1.795)\}}$ that L≈1.87(liter/min.).

Here, if the flow rate of electrolyte of the redox flow battery shown in this example is assumed to have a possible range of 0.8 to 1.15 liter/min., then L≈1.87 is a value outside the possible range. Hence, a possible optimum vale in the variable range of L is:

Combination of n such that $\partial g/\partial n=0$ and the minimum value of 0.8 in the variable range of L, i.e. (n, L)=(0.39, 0.8), or Combination of n such that $\partial g/\partial n=0$ and the maximum value of 1.15 in the variable range of L, i.e. (n, L)=(0.29, 1.15).

By substituting the value above for $g(x_{ave},\sigma^2,n,L)$, an optimum value is obtained when (n,L)=(0.39,0.8).

Figure 7:
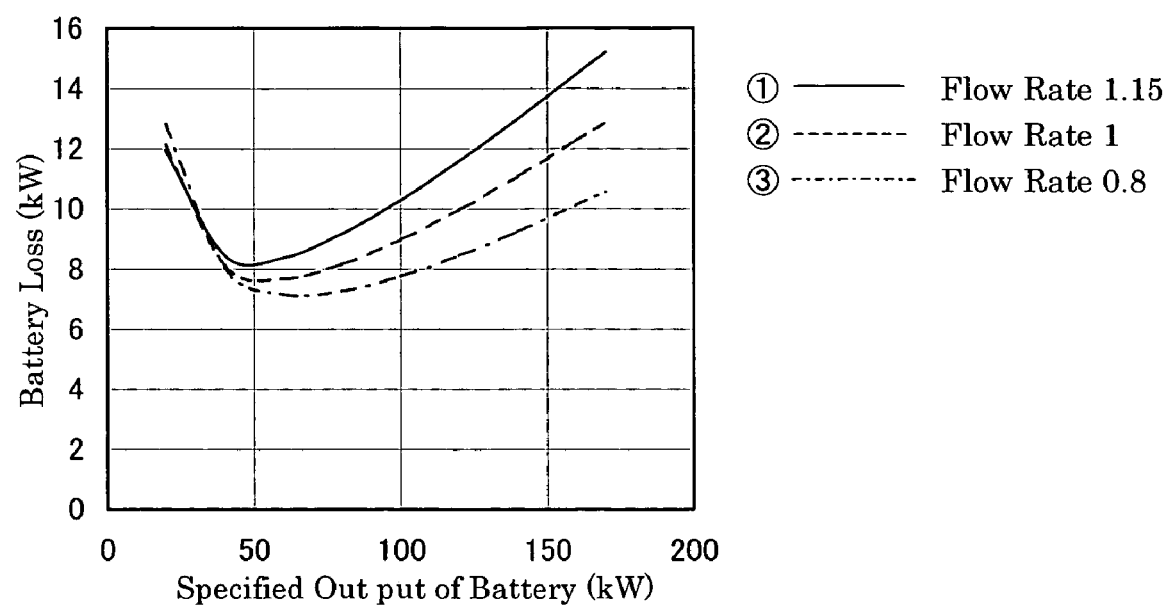
FIG. 7 is a graph showing a relation between a specified output of the redox flow battery and the loss characteristic of the same.

This means that when 0.39 battery of the specified output of 170 kW is used and the flow rate of electrolyte is set at 0.8 liter/min., the loss can be minimized. In other words, when a battery of a specified output of 170×0.39≈66.3 kW is used, the loss can be minimized. FIG. 7 shows a graph of expected values $g(x_{ave}, \sigma^2,n,L)$ (by letting $x_{ave}=0.9$ and valiance $\sigma^2=54.1^2$) when the flow rate of the electrolyte is taken to be in a possible range of 0.8 to 1.15 liter/min.

It can be seen from FIG. 7 that in this example, when the flow rate shown in ② above is 1.00 liter/min.·cell, the specified battery output is in the range of about 40 kW to about 100 kW (about 0.74 to about 2 times of the standard deviation of 54.1 kW), or particularly in the range of about 50 kW to about 80 kW (about 0.92 to about 1.5 times of the same), the battery loss is reduced and thus the system loss can be reduced. From the foregoing, it can be seen that when the flow rate is set at 0.8 liter/min. * cell and the specified battery output is set at 66.3 kW, the system loss can be minimized.

From the foregoing, it was found that when the system charges or discharges electricity irregularly, with the average value of the charged/discharged power of the system of substantially zero, for stabilization of the power generation by wind and the like, the design of the internal parameters, such as the specified output of the battery, the specified output of the DC/AC converter, and the flow rate of the electrolyte, can be determined from the basic statistic, using the average value and the variance of the parameters of the battery output and so on which a designer cannot choose voluntarily. It was also confirmed that when at least either of the specified output of battery and the specified output of converter is determined taking the standard deviation into consideration, the system loss can be reduced. It was found to be particularly preferable that the specified output of battery is set to be in the range from not less than 0.7 time to not more than 2 times of standard deviation and the specified output of converter is set to be in the range from not less than 1 time to not more than 4 times of the standard deviation. This is because when the specified output of battery and the specified output of converter are in these ranges, respectively, the system loss is reduced further, leading to further improved system efficiency.

In the system of this example, if variation is smoothed to be about 1.5 times to about 2 times as in the example by e.g. increasing the number of windmills and time windows to be smoothed, then it is estimated that the converter loss will be reduced (5-2.5)/5=about 50% (Cf. FIG. 4) and the battery loss will be reduced (15-8)/15=about 47%, thus achieving reduction of the system loss. In other words, in the system of this example, the converter loss+battery loss=5+15=about 20 kW loss at 44.4 kW which is the average of the absolute value of the battery output is reduced to 2.5+8=about 10.5 kW in total. Thus, the loss rate of the system can be reduced to approximately half, from 20/44.4=about 45% to 10.5/44.4=about 24%.

(Test Sample)

The system loss was examined, varying the specified output of the redox flow battery and the specified output of the DC/AC converter used in the example mentioned above. In the test, the power generation by wind was used for all samples, with its maximum output set at 400 kW and its specified output of power generation set at 285 kW. The specified outputs of the redox flow battery and converter used in the test, and the loss of the battery system used in the test are shown in TABLE 1.

TABLE 1

| Sample No. | Specified output of battery (kW) | Specified output of converter (kW) | Loss of battery system (kW) | Smoothing of power generation by wind |
|---|---|---|---|---|
| 1 | 170 | 275 | 20 | Good |
| 2 | 85 | 147 | 10 | Good |
| 3 | 60 | 200 | 10 | Good |

In the samples No. 2 and No. 3, the specified output of the redox flow battery and the specified output of the DC/AC converter were determined from the standard deviation of the battery output determined in the example mentioned above. In the sample No. 2, the specified output of the battery was increased by 1.6 times of the standard deviation of 54.1 kW and the specified output of the converter was increased by 2.7 times of the standard deviation of the same. In the sample No. 3, the specified output of the battery was increased by 1.1 times of the standard deviation of 54.1 kW and the specified output of the converter was increased by 3.7 times of the standard deviation of the same. On the other hand, in the sample No. 1, the specified output of the battery and that of the converter were determined without any particular consideration of the standard deviation of the battery output. It was found from the test results that the samples No. 2 and No. 3 reduced the battery system loss to approximately half of the sample No. 1.

CAPABILITIES OF EXPLOITATION IN INDUSTRY

As explained above, the method of designing a redox flow battery system of the present invention can provide the advantageous result that the characteristic function to evaluate the system can be optimized by determining an optimum value of the internal parameter based on the average value of the external parameter and the standard deviation.

Particularly by determining the specified output of the battery and that of the DC/AC converter based on the average value of the battery output and the standard derivation, the system loss can be reduced. This enables the battery system loss to be reduced without annexing the lead storage battery to the system, as the related art does. This can provide a reduced scale of the hardware of the system and thus a more economic system, as compared with the related art. Further, since no lead storage battery is required, production costs can be reduced.

The invention claimed is:

1. A method of designing a redox flow battery system comprising the steps of:
   determining a difference between an output of power generation of generating equipment that varies irregularly in output of power generation, and a desired target output obtained by smoothing the output of power generation,
   determining an average value and a standard deviation of a distribution of the output difference,
   determining at least one of a specified output of the redox flow battery, number of the batteries, a specified output of a DC/AC converter for converting the battery output, and number of the DC/AC converters for converting the battery output, to maximize a system efficiency of the system or to minimize a loss rate of the system, based on the average value and the standard deviation.

2. The method of designing a redox flow battery system according to claim 1, wherein when the difference between an output of power generation of generating equipment that varies irregularly in output of power generation, and a desired target output obtained by smoothing the output of power generation is an external parameter, and the at least one of a specified output of the redox flow battery, number of the batteries, a specified output of a DC/AC converter for converting the battery output, and number of DC/AC converters for converting the battery output is an internal parameter, the method comprises the steps of:
   letting a performance index comprising the system efficiency or the loss rate be a characteristic function of the external parameter and the internal parameter,
   rewriting the characteristic function as a new characteristic function in the form of an equation of a high degree considering the average value and the standard deviation, and
   determining the internal parameter from the condition that takes a local extreme value in the equation of high degree.

3. The method of designing a redox flow battery system according to claim 2, wherein the new characteristic function in the form of an equation of a high degree is a characteristic function in the form of a quadratic equation.

4. The method of designing a redox flow battery system according to claim 2, wherein the new characteristic function in the form of an equation of a high degree is a characteristic function in the form of a cubic or more equation.

* * * * *